(12) United States Patent
Lee et al.

(10) Patent No.: US 7,707,321 B2
(45) Date of Patent: *Apr. 27, 2010

(54) CHAINED DMA FOR LOW-POWER EXTENDED USB FLASH DEVICE WITHOUT POLLING

(75) Inventors: Charles C. Lee, Cupertino, CA (US); David Q. Chow, San Jose, CA (US); Abraham C. Ma, Fremont, CA (US); Frank Yu, Palo Alto, CA (US); Ming-Shiang Shen, Taipei Hsien (TW); Horng-Yee Chou, Superior, CO (US)

(73) Assignee: Super Talent Electronics, Inc., San Jose, CA (US)

( * ) Notice: Subject to any disclaimer, the term of this patent is extended or adjusted under 35 U.S.C. 154(b) by 231 days.

This patent is subject to a terminal disclaimer.

(21) Appl. No.: 11/928,124

(22) Filed: Oct. 30, 2007

(65) Prior Publication Data

US 2008/0065794 A1 Mar. 13, 2008

Related U.S. Application Data

(63) Continuation-in-part of application No. 11/624,667, filed on Jan. 18, 2007, and a continuation-in-part of application No. 11/864,696, filed on Sep. 28, 2007, and a continuation-in-part of application No. 10/854,004, filed on May 25, 2004, and a continuation-in-part of application No. 10/708,096, filed on Feb. 9, 2004, now Pat. No. 7,130,958.

(51) Int. Cl.
*G06F 3/00* (2006.01)
*G06F 13/38* (2006.01)

(52) U.S. Cl. .................. 710/1; 710/5; 710/62; 709/230
(58) Field of Classification Search .................. None
See application file for complete search history.

(56) References Cited

U.S. PATENT DOCUMENTS

| 7,010,638 B2* | 3/2006 | Deng et al. ................. 710/306 |
| 2006/0174049 A1* | 8/2006 | Lin et al. ..................... 710/308 |
| 2009/0077277 A1* | 3/2009 | Vidal et al. .................... 710/46 |

* cited by examiner

OTHER PUBLICATIONS

Ismail, R. ,"USB 3.0 Presentation slides At INTEL Developer Forum", San Francisco, Sep. 18, 2007.

*Primary Examiner*—Henry W. H. Tsai
*Assistant Examiner*—Michael Sun
(74) *Attorney, Agent, or Firm*—Stuart T. Auvinen; gPatent LLC

(57) ABSTRACT

An extended Universal-Serial Bus (EUSB) host has reduced loading by using radio frequency (RF) transceivers or direct wiring traces rather than a pair of legacy USB cables. The reduced loading opens the eye pattern. The EUSB device transfers internal data using chained Direct-Memory Access (DMA). Registers in a DMA controller point to a vector table that has vector entries, each pointing to a destination and a source. The source is a memory table for a memory group. The memory table has entries for several memory segments. Each memory-table entry has a pointer to a memory segment and a byte count for the segment. Once all bytes in the segment are transferred, a flag in the entry indicates when another memory segment follows within the memory group. When an END flag is read, then vector table is advanced to the next vector entry, and another memory group of memory segments processed.

20 Claims, 13 Drawing Sheets

CHAINED DMA FOR LOW-POWER EXTENDED USB FLASH DEVICE WITHOUT POLLING

RELATED APPLICATIONS

This application is a continuation-in-part (CIP) of the application "Backward Compatible Extended-MLC USB Plug And Receptacle with Dual Personality", U.S. application Ser. No. 11/864,696 filed Sep. 28, 2007, which is a CIP of "Extended Secure-Digital (SD) Card Devices and Hosts", U.S. application Ser. No. 10/854,004 filed May 25, 2004. This application is also a CIP of "Serial Interface to Flash Memory Chip using PCI-Express-Like Packets and Packed Data for Partial-Page Writes", U.S. application Ser. No. 10/708,096 filed Feb. 9, 2004.

This application is also a continuation-in-part (CIP) of the application for "Electronic Data Storage Medium with Fingerprint Verification Capability", U.S. Ser. No. 11/624,667 filed Jan. 18, 2007.

FIELD OF THE INVENTION

This invention relates to extended Universal-Serial Bus (USB) systems, and more particularly to lower-power USB protocol extensions that reduce power.

BACKGROUND OF THE INVENTION

A great variety of small portable devices such as personal digital assistants (PDA), multi-function cell phones, digital cameras, music players, etc. have become widely available. These devices use a central processing unit (CPU) or microcontroller and a mass-storage memory such as a hard drive or flash memory. These small devices are often cost and size sensitive.

Hard disks and other mass storage devices are being replaced or supplemented with solid-state mass storage such as flash memories. Flash memories use non-volatile memory cells such as electrically-erasable programmable read-only memory, (EEPROM), but are not randomly accessible at the byte level. Instead, whole pages or sectors of 512 bytes or more are read or written together as a single page. NAND flash memory is commonly used for data storage of blocks. Pages in the same block may have to be erased together, and limitations on writing may exist, such as only being allowed to write each page once between erases.

These small portable electronic devices often are able to connect to a host computer such as a personal computer (PC). While a proprietary connector may be used, a connector for a standard expansion bus is preferable. Universal-Serial Bus (USB) is often used to connect such portable flash-memory devices to a PC.

USB uses one pair of differential lines that are time-duplexed, or used for transmission in both directions, but at different times. This may limit performance when data needs to be sent in both directions at the same time. The current USB 2.0 standard provides that the host, such as the PC, controls the bus as the bus master, while USB devices plugged into the host act as slave devices. A USB controller on the host PC generates data transfer transactions and waits for USB devices to respond, either by transmitting requested data to the host, or by writing host data into the USB device's memory.

Since memory on a USB device may be busy or slow, sometimes the host's request cannot be processed immediately. The host may send the request, then periodically poll the USB device to see whether the data is ready. Also, when the host is idle, the host may need to periodically poll the USB device to see if the USB device needs to transfer information to the host. This periodic polling may be used for other purposes as well, such as for polling a mouse for movement.

While polling is useful, since it allows the host to completely control the USB bus, power is consumed each time a packet is sent for polling. While this power is small, for low-power or battery-powered devices, the amount of power consumed may be significant and undesirable. Also, the USB device or host may otherwise be in a low-power sleep or suspend state, and have to wake up into a higher-power state to perform or respond to the polling. There may be significant time and energy required to wake up from the suspend or sleep state, and then to re-enter the suspend or sleep state once polling is done.

What is desired is a USB device and USB host that have lower power. A USB system that does not require polling is desirable. Bus protocols and transactions that avoid polling are desirable to be applied to USB to reduce energy consumed by polling.

DETAILED DESCRIPTION

The present invention relates to an improvement in Universal-Serial Bus (USB) Direct-Memory Access (DMA). The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
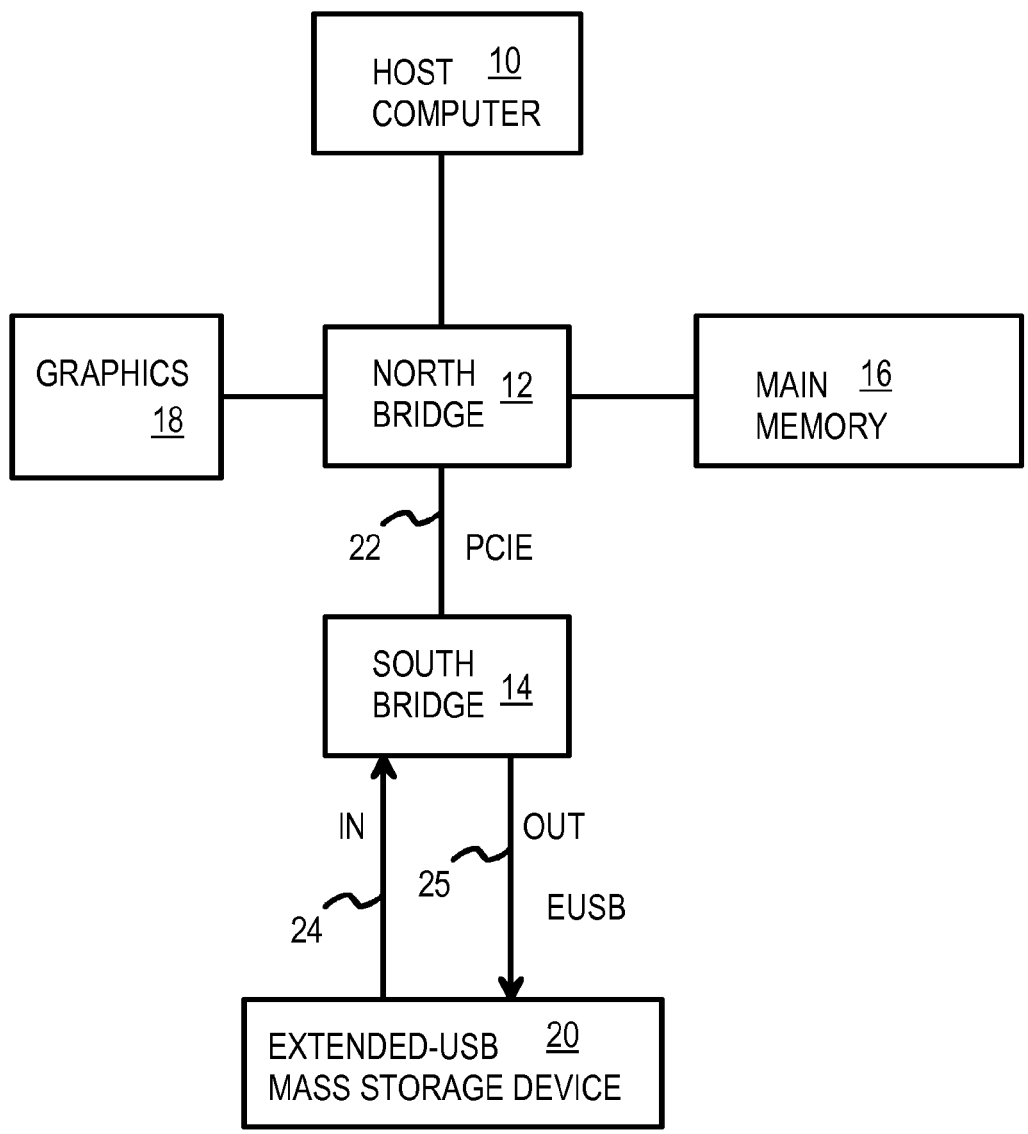
FIG. 1 is a block diagram of a simplified host and device connected with an extended Universal-Serial Bus (EUSB).

FIG. 1 is a block diagram of a simplified host and device connected with an extended Universal-Serial Bus (EUSB). Host computer 10 executes instructions including those in user and application programs, operating systems, device drivers, and other applets. Main memory 16 may be a dynamic random-access memory (DRAM) or other kind of RAM that stores instructions and data that is accessed by the central processing unit (CPU) in host computer 10.

North bridge 12 contains bus and memory controllers that generate control signals of the proper timing to main memory 16 and to graphics system 18. North bridge 12 also contains a Peripheral Components Interconnect Express (PCIE) controller that generates transactions on PCIE bus 22.

PCIE bus 22 connects north bridge 12 to south bridge 14. South bridge 14 also contains bus controllers and bus logic. An extended Universal-Serial Bus (EUSB) controller in south bridge 14 converts PCIE transactions into EUSB transactions that are sent to EUSB device 20 over the EUSB bus. However, rather than time-duplex a single differential pair of lines, two differential pairs are provided, allowing full-duplex data transfers. OUT differential pair 25 can be sending data from the host to EUSB device 20 at the same time that IN differential pair 24 is sending data read from EUSB device 20 back to host computer 10. Thus EUSB device 20 provides a higher performance than an ordinary USB 2.0 device that is only half-duplex.

Figure 2:
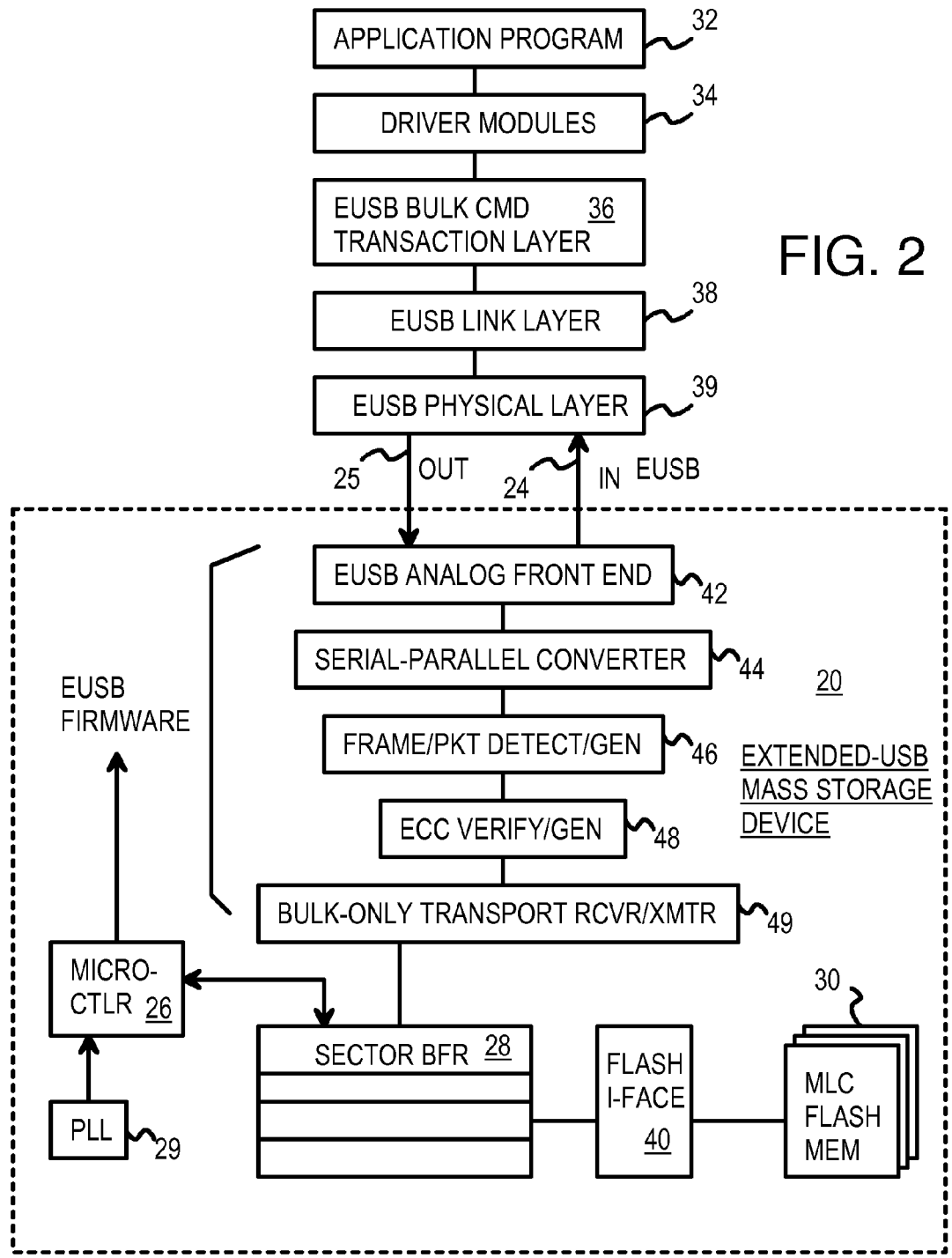
FIG. 2 shows an extended USB device connected to a EUSB host.

FIG. 2 shows an extended USB device connected to a EUSB host. Application program 32 on a host needs to read data that is stored in flash memory 30 on EUSB device 20. Application program 32 sends a data-read request to a device driver for the flash in device modules 34, which activate EUSB bulk-only-transfer and command transaction layer 36. EUSB bulk-only-transport and command transaction layer 36 embed a read command inside a EUSB data payload and header using the bulk-only-transport mode of USB. A cyclical-redundancy-check (CRC) checksum is also attached.

EUSB link layer 38 adds a sequence number and another CRC checksum, while EUSB physical layer 39 adds packet framing and performs 8/10-bit encoding. The framed data packet is sent from the host to EUSB device 20 over OUT differential pair 25.

EUSB analog front end 42 senses the data transitions on OUT differential pair 25, extracts the clock, and sends serial data to serial-parallel converter 44, which generates parallel data words. The parallel data words are examined by frame and packet detector 46 to locate frame and packet boundaries. The header and data payload can be located by bulk-only-transport receiver 49, ECC generator/checker 48 checks CRC's for error detection. The data payloads can be written into sector buffer 28.

Microcontroller 26 examines the headers and data payloads from bulk-only-transport receiver 49 and detects the read command. Microcontroller 26 activates flash interface 40 to perform a read of flash memory 30, and the flash data read is transferred into sector buffer 28. This flash data in sector buffer 28 is formed into data payloads, a header attached by bulk-only-transport receiver 49, and passed back down the layers for transmission to the host over IN differential pair 24.

Phase-locked loop (PLL) 29 may be driven by an external crystal (not shown) and generates an internal clock to microcontroller 26 and other components such as sector buffer 28. Microcontroller 26 controls operation of EUSB firmware that may include bulk-only-transport receiver 49, ECC generator/checker 48, frame and packet detector 46, serial-parallel converter 44, and EUSB analog front end 42.

When the EUSB device is not yet ready to send data to the host, the EUSB device asserts a not yet (NYET) signal to the host. When the EUSB device is ready again to send data, it asserts a ready (RDY) signal to the host, and de-asserts the NYET signal.

The addition of the NYET and RDY signals allows the host to simply monitor these signals to detect when the EUSB device is ready to continue sending data. With the NYET signal, the host no longer has to continuously poll the USB device to determine when the data is ready for transmission.

The host is still the bus master and initiates a transfer by sending a packet with the IN request to the EUSB device. The request also contains a number that indicates a number of buffers available in the host, or the number of packets that can be accepted by the host. Other information such as a device identifier or address of the EUSB device can be included in the IN request packet.

Figure 3A:
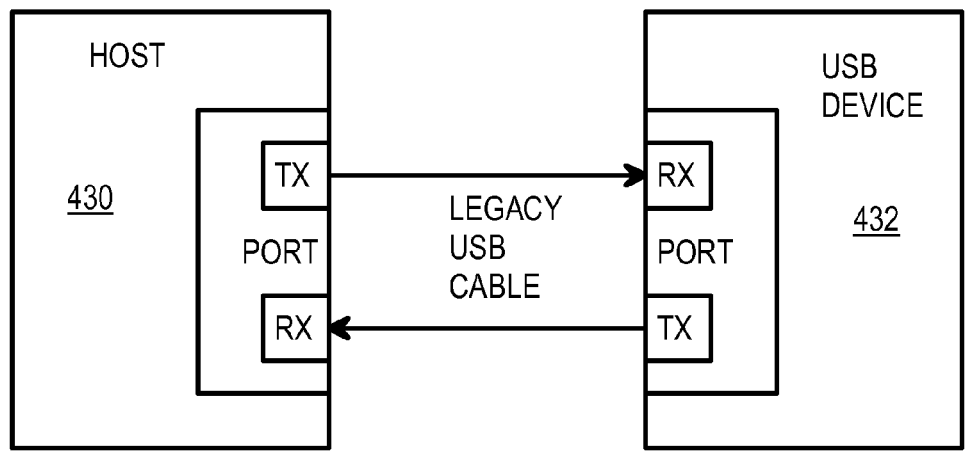
FIGS. 3A-B show a closed eye pattern that results from a legacy USB cable.
Figure 3B:
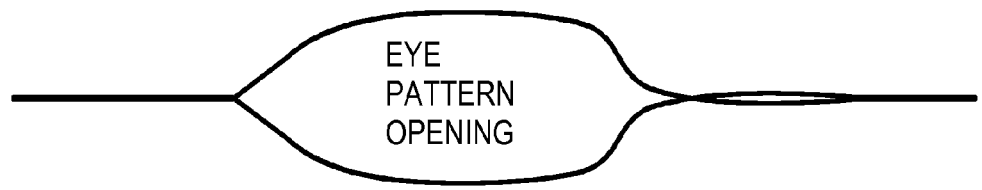

FIGS. 3A-B show a closed eye pattern that results from a legacy USB cable. In FIG. 3A, host 430 communicates with EUSB device 432 over a pair of legacy USB cables that have one differential pair per cable. The loading of the legacy USB cables are high, so the eye pattern shown in FIG. 3B is relatively closed, having a small voltage opening.

Figure 4A:
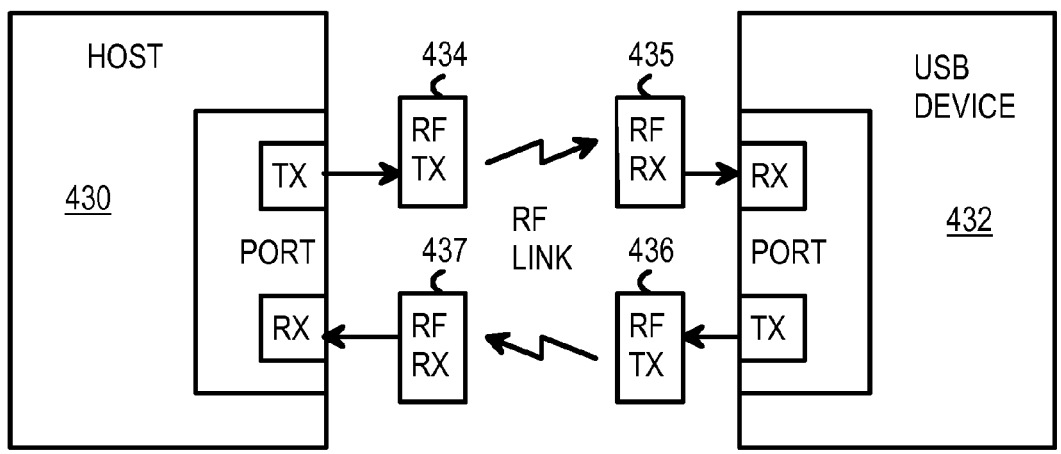
FIGS. 4A-B show an opened eye pattern that results from eliminating the cable.
Figure 4B:
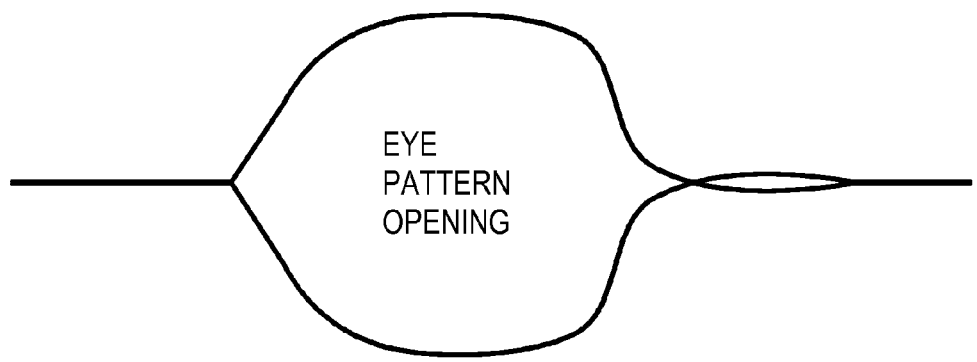

FIGS. 4A-B show an opened eye pattern that results from eliminating the cable. In FIG. 4A, host 430 communicates with EUSB device 432 without a cable. Radio-frequency RF transmitter 434 sends radio signals to RF receiver 435 for the OUT differential pair, while RF transmitter 436 sends RF signals to RF receiver 437 for the IN differential pair.

Since the RF transmitters and receivers have very little capacitive loading compared with a legacy USB cable, the eye pattern shown in FIG. 4B is relatively opened, having a larger voltage opening. Rather than have RF transmitters and receivers, circuit-board traces could directly connect the EUSB host and device. Since traces have less loading that a USB cable, the eye pattern is also opened when wiring traces are used to connect the host and device.

Figure 5A:
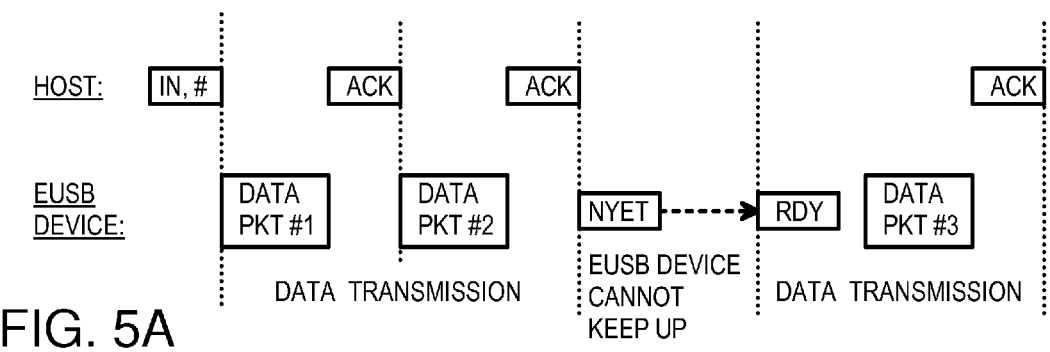
FIGS. 5A-B are packet-timing diagrams showing sequences of packets being sent to and received from the EUSB device.
Figure 5B:
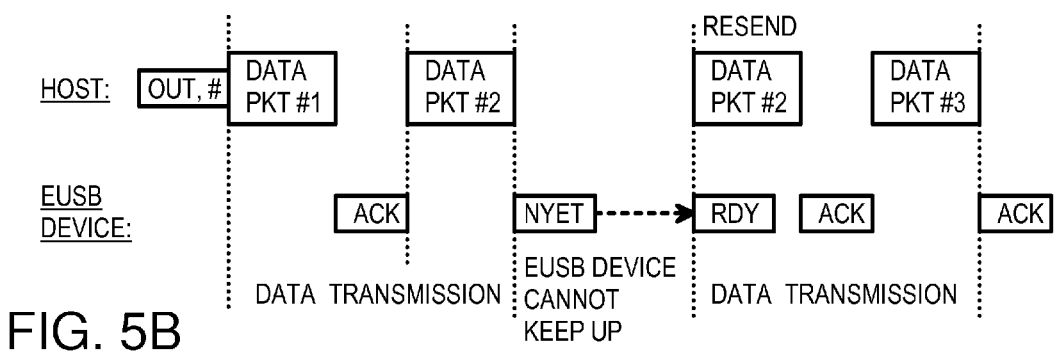

FIGS. 5A-B are packet-timing diagrams showing sequences of packets being sent to and received from the EUSB device. In FIG. 5A, the host sends a request to read flash memory from an EUSB device. The read request is embedded inside an IN packet that also contains a number of packets of data to read.

The EUSB device receives the IN packet and begins reading the data. The data may already be buffered in a cache or other buffer, such as when read-ahead caching occurs from an earlier read access. The EUSB device forms the first part of the requested data into data packet #1, which is sent back to the host.

The host sends an acknowledgement ACK to acknowledge receipt of data packet #1, and to request that the next packet be sent. The EUSB device reads the next data, forming data packet #2, which is also sent to the host.

The host sends another acknowledgement ACK to acknowledge receipt of data packet #2, and to request that the next packet be sent. However, the EUSB device cannot keep up with the pace of the host. The EUSB device sends a not yet NYET packet to the host since the next data is not yet ready.

The host responds to NYET signal by waiting. The host does not poll the EUSB device, but simply waits. After some time, the EUSB device catches up, and sends a ready RDY signal to the host. The EUSB device reads the next data, forming data packet #3, which is also sent to the host. The host sends an acknowledgement ACK to acknowledge receipt of data packet #3. Since only 3 packets were requested with the IN packet, the IN transaction ends.

In FIG. 5B, the host sends a request to write to flash memory in an EUSB device. The write request is embedded inside an OUT packet that also contains a number of packets of data to write. The host forms the first part of the write data into data packet #1, which is sent to the EUSB device after the OUT packet is sent.

The EUSB device receives the OUT packet and begins writing the data from data packet #1. The data may first be buffered in a cache or other buffer before writing to flash memory.

The EUSB device sends an acknowledgement ACK to acknowledge receipt of data packet #1, and to request that the next packet be sent. The host forms the next data into data packet #2, which is also sent to the EUSB device.

The EUSB device buffer is now full. The EUSB device cannot keep up with the pace of the host. The EUSB device sends a not yet NYET packet to the host since the sector buffer is full, and the EUSB device cannot receive more data.

The host responds to NYET signal by waiting. The host does not poll the EUSB device, but simply waits. After some time, the EUSB device catches up, and sends a ready RDY signal to the host. Since the EUSB device did not acknowledge receipt of data packet #2, the host re-sends data packet #2. The EUSB device buffers this data, and sends an acknowledgement ACK for the re-sent data packet #2.

The host forms data packet #3, which is also sent to the EUSB device. The EUSB device sends an acknowledgement ACK to acknowledge receipt of data packet #3. Since only 3 packets were requested with the OUT packet, the OUT transaction ends.

Figure 6:
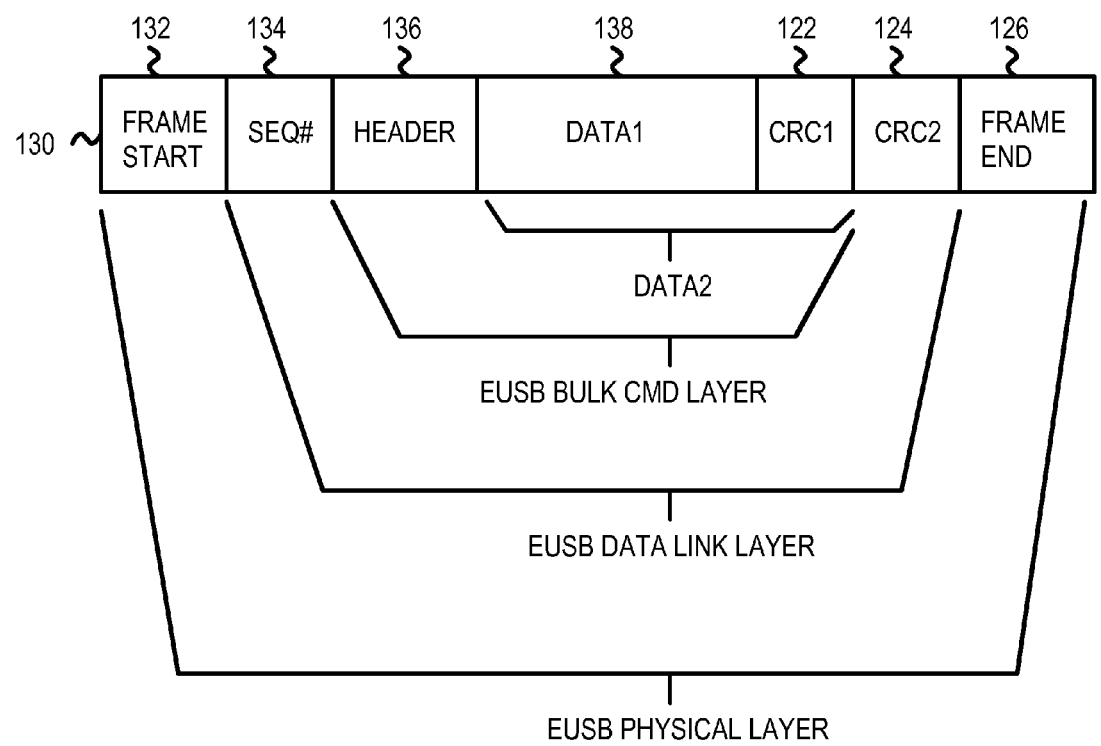
FIG. 6 shows an EUSB packet.

FIG. 6 shows an EUSB packet. EUSB packet has several layers of fields that are added by the layers shown in FIG. 7. Data payload 138 contains the flash data and flash commands. CRC1 122 is an inner CRC of data payload 138 that is formed by the flash file system. Together, data payload 138 and CRC1 122 form outer data payload DATA2 that is sent to the EUSB transport layer.

The EUSB transport layer processed bulk-only-transport and commands. Header 136 is generated and may contain EUSB commands. The EUSB data-link layer accepts header 136 and the outer data payload of data payload 138 and inner CRC1 122, and generated an outer CRC of these fields as CRC2 124. Sequence number 134 is generated and included in the calculation of CRC2 124.

The EUSB physical layer adds framing bits in frame start field 132 and frame end field 126 to make packet 130 have a pre-determined size. 8/10-bit encoding is also performed.

Figure 7:
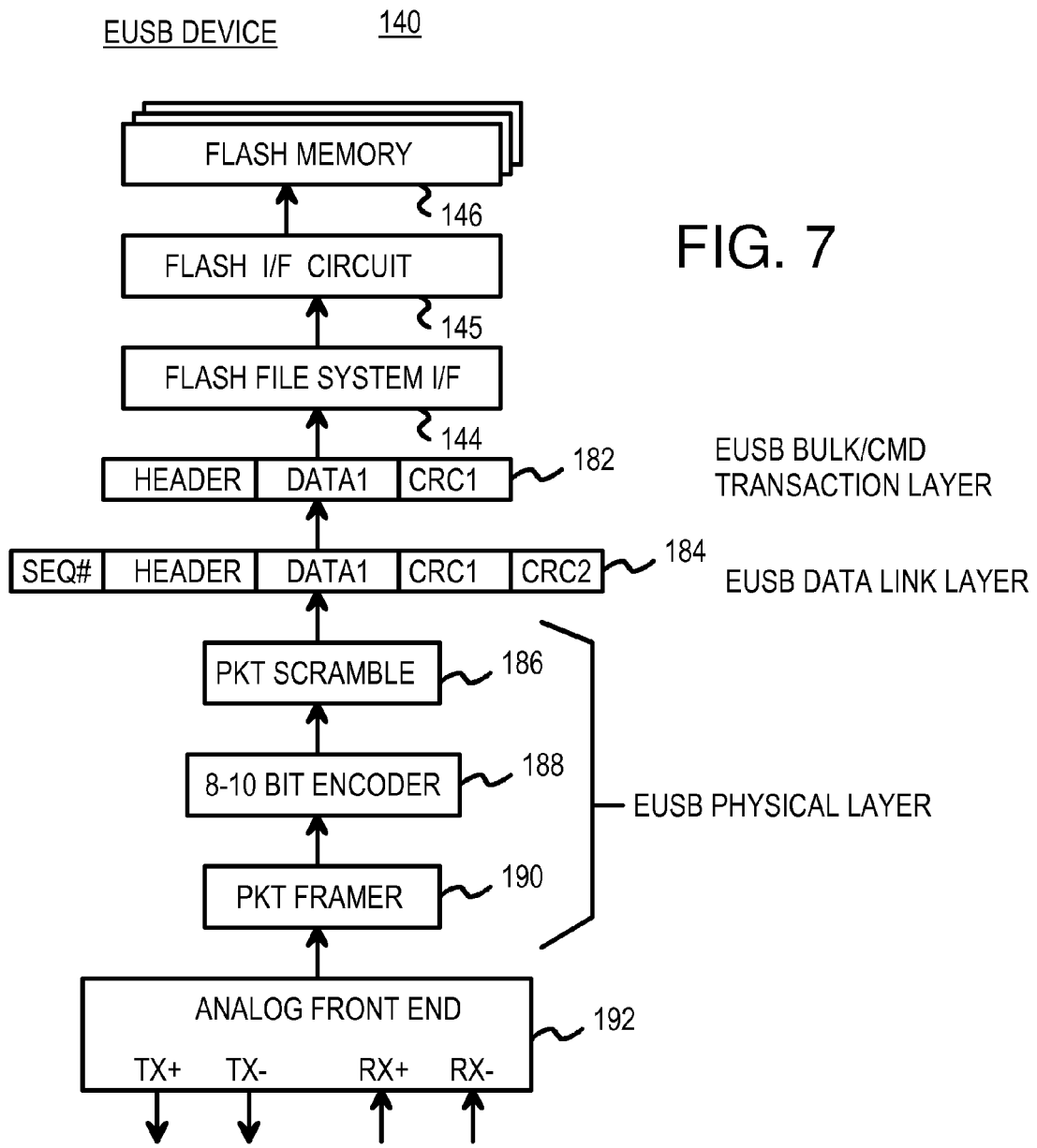
FIG. 7 is a diagram of an EUSB flash-memory device.

FIG. 7 is a diagram of an EUSB flash-memory device. EUSB device 140 connects to an EUSB host over an EUSB bus that has two differential pairs of lines for full-duplex transfers, a transmit pair TX+, TX−, and a receive pair RX+, RX−. Software application programs on the host read data that is stored in flash memory 146 on EUSB device 140.

On EUSB device 140, the EUSB physical layer includes analog front end 192 that senses the data transitions on the OUT differential pair, extracts the clock, and converts serial data to parallel. Packet framer 190 detects frame and packet boundaries, while encoder 188 performs 8/10-bit decoding. Packet scrambler 186 is used to make the data stream more random and more evenly distributed to avoid possible burst errors occurring in telecommunication applications. A bit-shifter and XOR may be used.

EUSB data link layer 184 reads sequence numbers (SEQ#) from packets received and puts these packets in sequential order. A cyclical-redundancy-check (CRC2) checksum is also generated and compared to detect errors at the link level.

EUSB transaction layer 182 processes EUSB commands and also bulk-only-transport of data. An ECC generator/checker checks inner CRC 1 for error detection at the transport level. The header can be extracted and the data payload DATA1 can be written into a sector buffer. Flash file system interface 144 examines the headers and data payloads and detects a read command. Flash interface circuit 145 is activated by flash file system 144 to perform a read of flash memory 146, and the flash data read is transferred into a sector buffer. This flash data in the sector buffer is formed into data payloads, a header attached by EUSB transaction layers 182, and passed back down the layers for transmission by analog front end 192 to the host over the IN differential pair.

Figure 8:
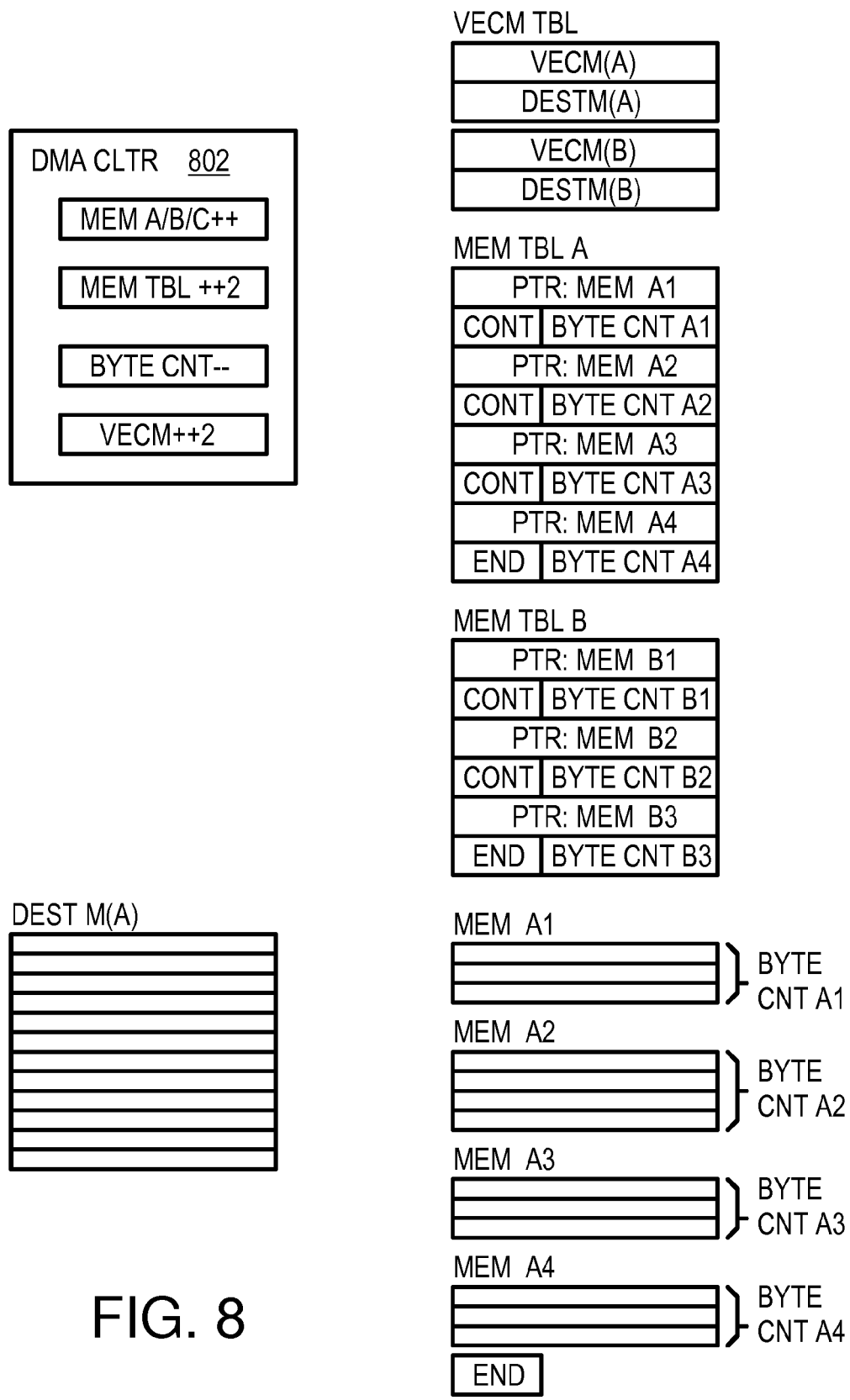
FIG. 8 shows chaining DMA in a EUSB device.

FIG. 8 shows chaining DMA in a EUSB device. Multiple levels of DMA accesses may be used for increased flexibility and adaptability. The parallel words received or sent by the lower EUSB layers may be stored in a sector buffer. Data from a larger memory may be transferred to and from the sector buffer using chained DMA as described for FIGS. 8-10.

DMA controller 802 includes several registers that control the DMA transfer. The memory group pointer MEMA/B/C points to one of three memory groups A, B, C. This memory group pointer is incremented to point to the next memory group when the previous memory group has been transferred.

Each memory group has one memory table that contains pointers to several memory segments. The memory table pointer points to one pointer entry in the memory table of the current memory group. Since each pointer entry is 2 words long, the memory table pointer is incremented by 2 to point to the next memory segment after the prior memory segment has been transferred.

The byte counter in DMA controller 802 counts the number of bytes transferred in the current memory segment. This byte counter is initially loaded with the number of bytes in the current memory segment, then decremented as bytes are transferred. When the byte counter reaches 0, then transfer of the memory segment is complete, and the next memory segment can be transferred.

The vector pointer in DMA controller 802 points to a vector entry in a vector table. Each vector entry is for one memory group, and points to a memory table, such as memory table A or memory table B for memory group A and memory group B. The vector pointer is advanced by 2 as each memory group is transferred, since each vector entry is 2 words long.

The EUSB device memory includes a vector table VECM TBL, several memory tables MEM TBL A, MEM TBL B, for memory groups A, B, and many memory segments MEM A1, MEM A2, MEM A3, MEM A4, MEM B1, MEM B2 . . . . Each memory segment contains the data to be transferred by DMA controller 802. The length of each memory segment is indicated by the byte count BYTE CNT A1, BYTE CNT A2, . . . for that segment. These bytes of data from these memory segments are moved from these source locations to one or more destination locations DEST M(A), DESTM(B) . . . . The destination location or the source locations may be the sector buffer.

Each vector entry in the vector table has a vector pointer VECM(A), VECM(B) that is a pointer to the start of a memory table for that memory group. This is the source pointer. The vector entry also has a pointer to the destination, such as DESTM(A), DESTM(B) for each memory group. For example, the first vector entry points to MEM TBL A as the first source memory table, and DESTM(A) as the first destination.

Each entry in a memory table has a pointer to a memory segment, such as PTR:MEM_A1. Each entry also has a byte count for that memory segment. A flag in each entry indicates when another memory segment follows that memory segment within the memory group (CONT), or whether the memory segment is the last memory segment in the memory group (END).

Figure 9A:
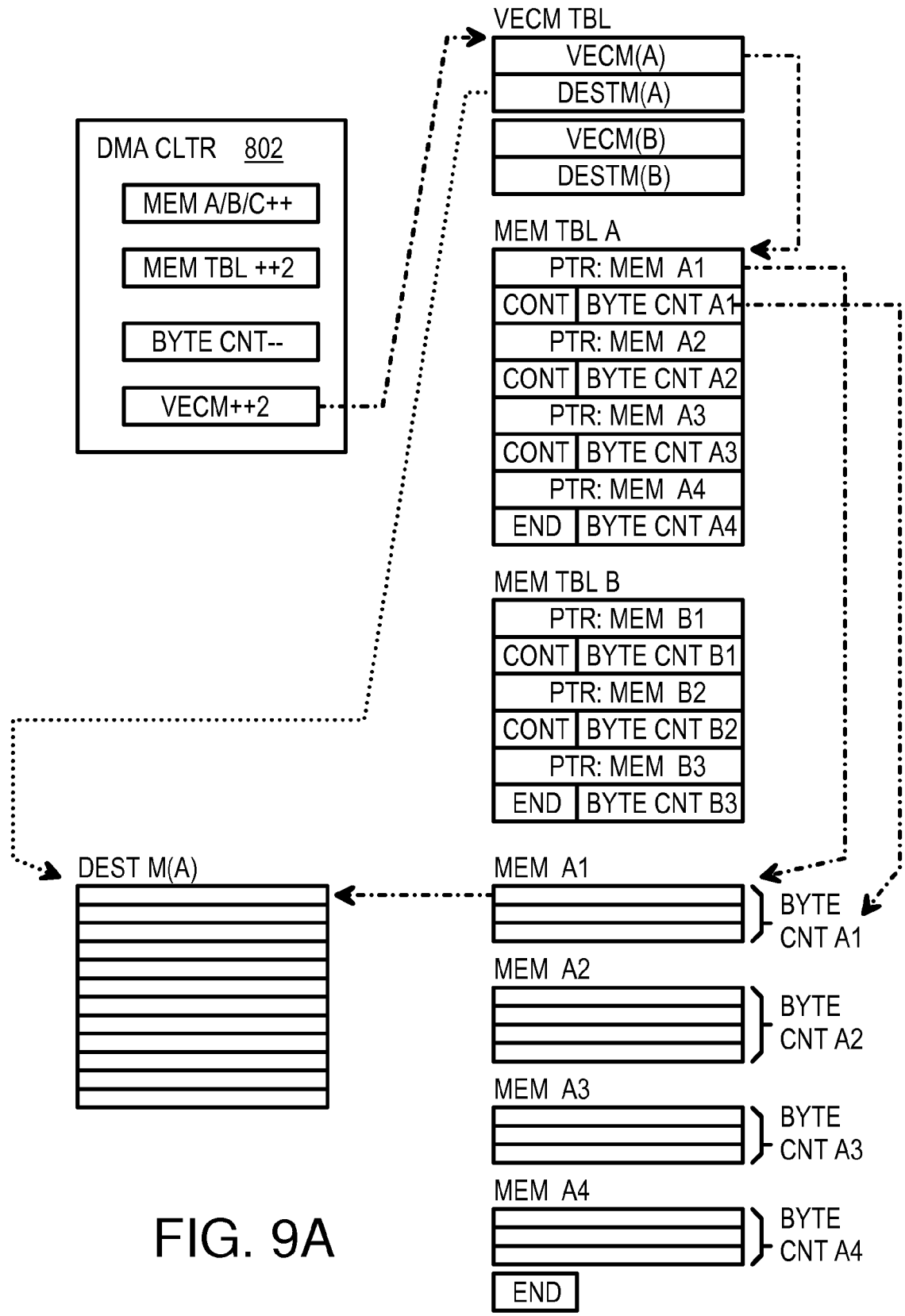
FIGS. 9A-C highlight chaining DMA in operation.
Figure 9B:
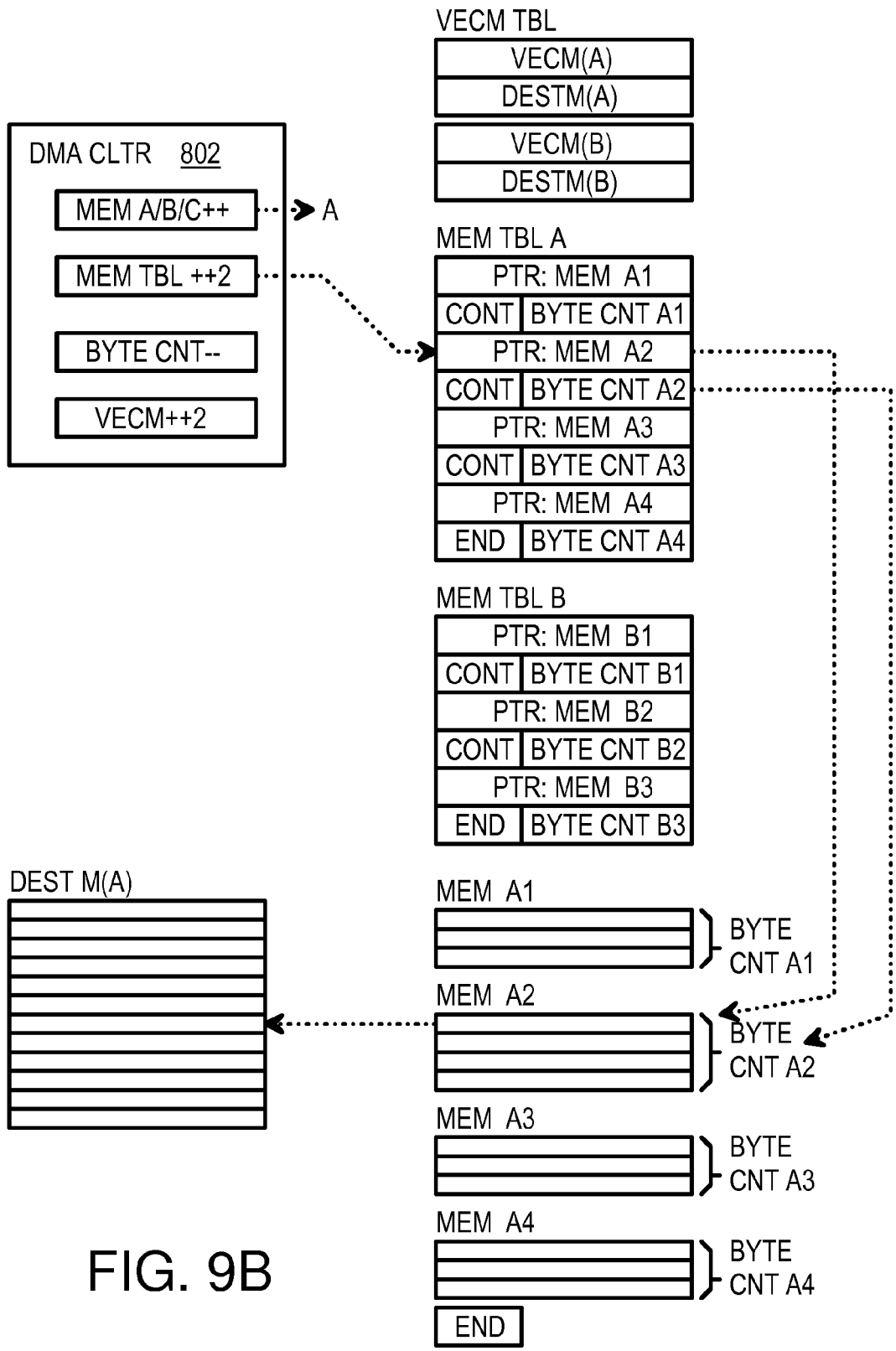
Figure 9C:
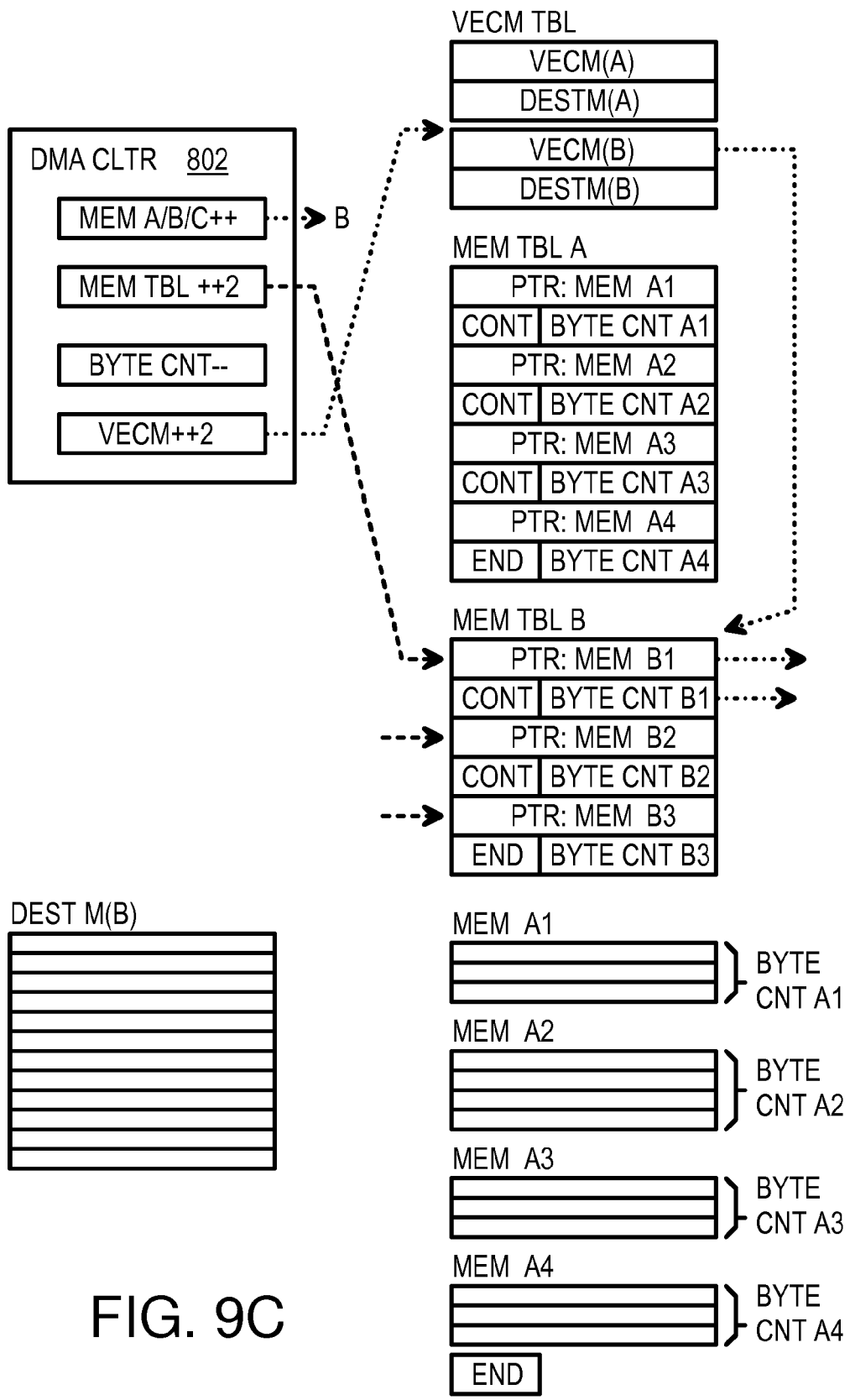

FIGS. 9A-C highlight chaining DMA in operation. In FIG. 9A, the vector pointer in DMA controller 802 points to the first entry in the vector table. This first entry has a source pointer that points to the start of memory table A (MEM TBL A), and a destination pointer to DESTM(A). The first entry in the memory table is selected since the memory-table pointer has not yet been advanced. This first entry points to memory segment MEM A1, and has a byte count BYTE CNT A1. DMA controller 802 reads BYTE CNT A1 bytes from memory segment MEM A1, and writes these bytes to DESTM(A). Since the first entry in memory table A has a CONT flag, the memory table pointer in DMA controller 802 is advanced to point to the next entry in memory table A, as shown in FIG. 9B.

This second entry in MEM TBL A points to memory segment MEM A2, and has a byte count BYTE CNT A2. DMA controller 802 reads BYTE CNT A2 bytes from memory segment MEM A2, and continues to write these bytes to DESTM(A). Since the second entry in memory table A has a CONT flag, the memory table pointer in DMA controller 802 is advanced to point to the next entry in memory table A. Memory segments A3, A4 are processed in a similar manner. The END flag in the fourth entry in memory table A indicates that no more memory segments need to be processed in memory group A.

In FIG. 9C, the memory-group pointer in DMA controller 802 is advanced from memory group A to memory group B. This causes the second vector entry in the vector table to be selected. The destination is changed to DESTM(B), and the source vector pointer points to memory table B. The memory table pointer is reset to point to the first entry in memory table B. This first entry points to memory segment B1. The byte counter indicates how many bytes to transfer from memory segment B1. Then the memory table pointer is advanced to the second entry in MEM TBL B, and memory segment B2 is transferred. The memory table pointer is advanced again to point to the third entry in MEM TBL B, and memory segment B3 is transferred.

Since this third segment has an END flag, transfer of memory group B is completed. A third memory group of segments could be transferred if there was a third vector entry in the vector table, but since there are only two entries in the vector table, there are no more memory groups to process, and the DMA transfer ends.

Figure 10:
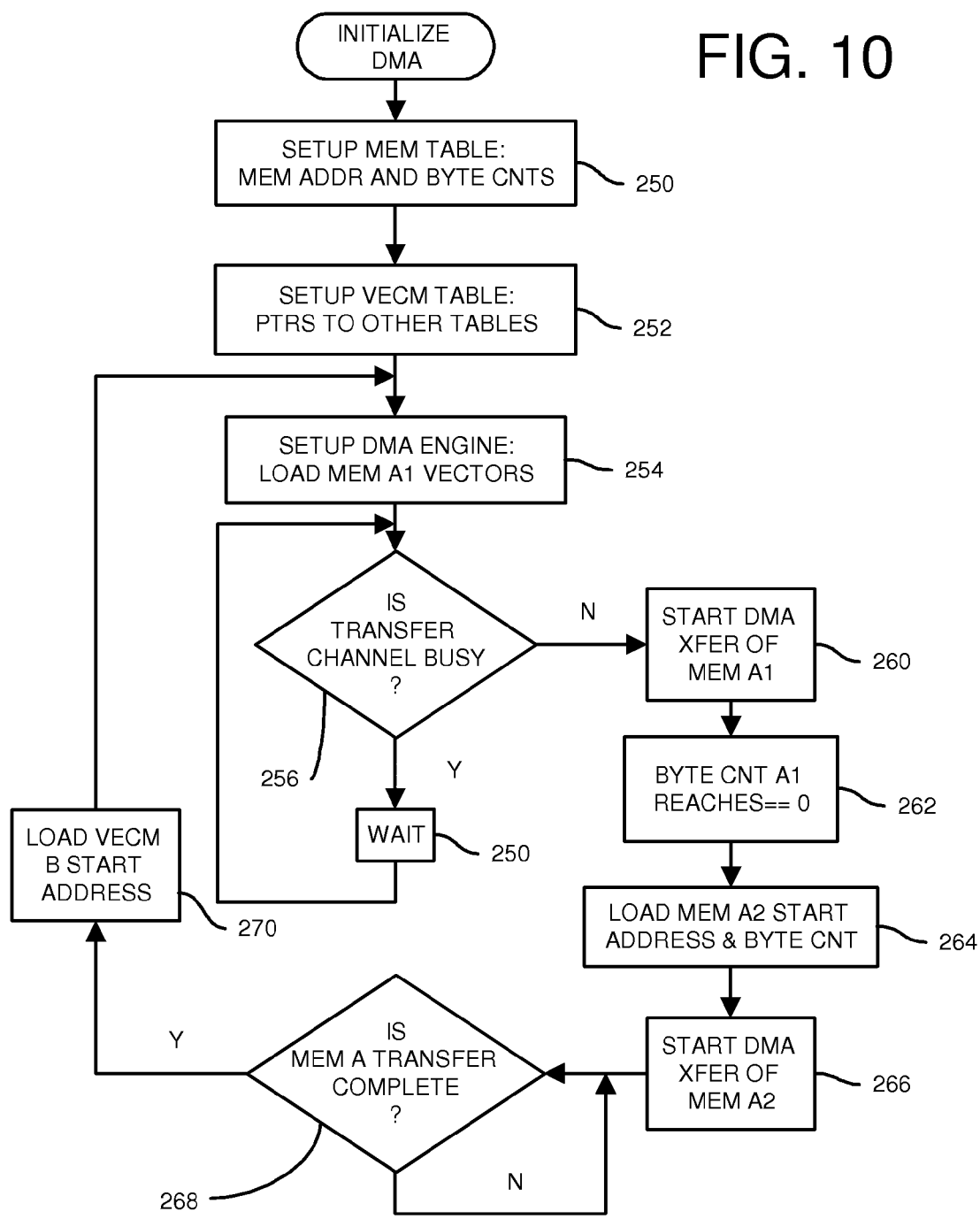
FIG. 10 is a flowchart of chaining DMA for an EUSB device.

FIG. 10 is a flowchart of chaining DMA for an EUSB device. When the DMA transfer is first initialized, the memory tables are setup by writing the pointers to the memory segments and byte counts for each segment to each entry in the memory table, step 250. This setup is repeated for other memory groups, each having a separate memory table.

The vector table is also setup, step 252. A vector entry is written for each memory group (A, B, C . . . ). Each vector entry has a pointer to a memory table (source), and a destination pointer.

As transfer begins, the DMA engine, DMA controller 802, is setup by writing the registers for processing the first segment, MEM A1, step 254. The byte count and address pointer to segment A1 are written into the registers in DMA controller 802. The starting addresses of the vector table and the memory table for the current group are also written to the registers in DMA controller 802, step 254.

When the DMA transfer channel needed for this segment is busy, step 256, then the DMA engine must wait, step 250, until the channel is free, step 256. Once the channel is available, DMA transfer of the first memory segment A1 begins, step 260. The byte count register is decremented for each byte read from the source segment A1 and written to the destination DEST MEM(A), until the byte count reaches zero, step 262.

Then the starting address of the second memory segment A2 is loaded into the registers in DMA controller 802, along with the byte count for segment A2, step 264. Transfer of bytes in memory segment A2 occurs, step 266, and continues until the byte count reaches zero. This continues for other memory segments in the current memory group. Once the END flag is reached, the transfer for memory group A is done, step 268. Then the vector pointer is advanced to point to the second entry for memory group B, step 270, and the starting address for segment B1 is loaded. transfer continues for segments in group B, and then for other groups, until all groups in the vector table have been processed.

Figure 11:
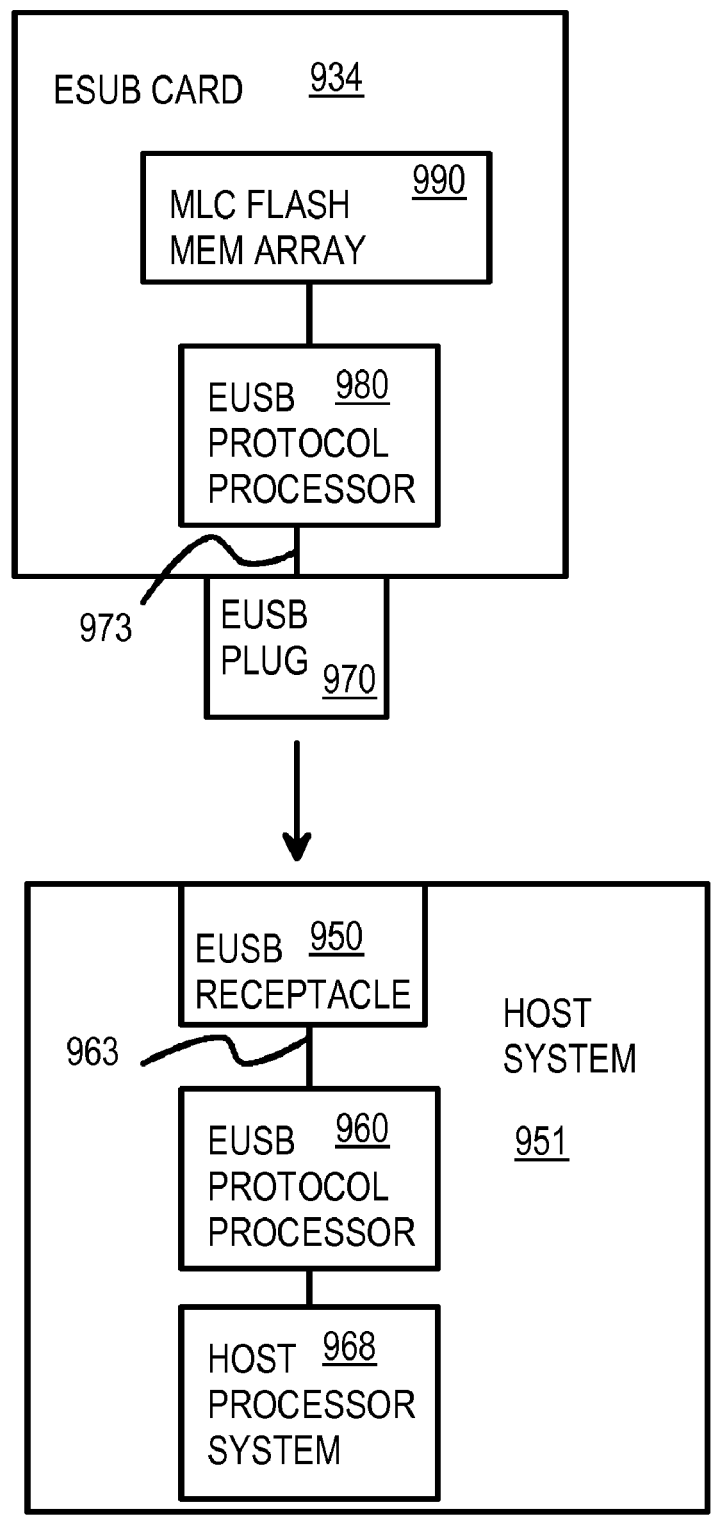
FIG. 11 is a block diagram of host with a EUSB receptacle that supports single-mode EUSB communication.

FIG. 11 is a block diagram of host with a EUSB receptacle that supports single-mode EUSB communication. EUSB card 934 could be plugged into EUSB receptacle 950 of host 951. Host 951 could be a cell phone or a digital camera, etc. EUSB receptacle 950 supports single-mode EUSB communication.

Host 951 has a processor system 968 for executing programs including EUSB management and no-polling programs. Single-personality bus interface 963 communicates processed data from processor system 968 using EUSB protocols.

EUSB card 934 is a EUSB device with a plug that supports EUSB communication. EUSB card 934 has processor system 980 for executing programs including device initializations and bus-response programs. Single-personality bus interface 973 communicates processed data from processor system 980 using the EUSB protocol to its plug 970. MLC flash memory 990 is a flash memory.

ALTERNATE EMBODIMENTS

Several other embodiments are contemplated by the inventors. Universal-Serial Bus (USB) can be extended to eliminate polling by using the NYET and other signals described herein. USB 2.0 may be modified, or other versions of USB may be modified. Destination and source pointers could be swapped. Additional levels of DMA could be added.

The suspend or sleep mode of the host may be with respect to the target EUSB device, rather than to all USB devices. For example, the host may have several channels, each performing a transaction with a different EUSB device. Only channels to busy EUSB device are suspends; other channels from the host may continue operation. Since transfers that are suspended may be re-started by the host, the state of the current transfer does not have to be saved when the host goes into suspend mode. Not having to save state variables can reduce the complexity of the host's suspend mode Instead of USB or other differential buses mentioned above, SD, MicroSD, MMC, or microMMC interfaces can also be applied in this invention. Rather than use SD buses, other buses may be used such as Memory Stick (MS), Compact Flash (CF), IDE bus, etc. Additional pins can be added or substituted for the SD data pins. A multi-bus-protocol chip could have an additional personality pin to select which bus interface to use, or could have programmable registers. Rather than have a SD microcontroller, a Memory Stick microcontroller could be substituted, for use with a memory-stick interface, etc.

While a sector size of 512 bytes has been described, the page size may have another size, such as 1 K, 2 K, 4K, 8K, etc. Flash blocks may have 4 pages, 8 pages, 64 pages, or some other number, depending on the physical flash chips and arrangement used.

While the invention has been described using an USB controller, a SD or MMC controller may be substituted. A combined controller that can function for both MMC and SD may also be substituted.

Mode logic could sense the state of a pin only at power-on rather than sense the state of a dedicated pin. A certain combination or sequence of states of pins could be used to initiate a mode change, or an internal register such as a configuration register could set the mode.

The microcontroller and USB components such as the protocol layers, bus interface, DMA, flash-memory controller, transaction manager, and other controllers and functions can be implemented in a variety of ways. Functions can be programmed and executed by the CPU or other processor, or can be implemented in dedicated hardware, firmware, or in some combination. Many partitioning of the functions can be substituted.

Data and commands may be routed in a variety of ways, such as through data-port registers, FIFO or other buffers, the CPU's registers and buffers, DMA registers and buffers, and flash registers and buffers. Some buffers may be bypassed or eliminated while others are used or present. Virtual or logical buffers rather than physical ones may also be used. Data may be formatted in a wide variety of ways.

The host can transfer standard USB commands and data transactions to the USB transceiver during a transaction, or may switch to EUSB mode to save power. Other transaction types or variations of these types can be defined for special purposes. These transactions may include a flash-controller-request, a flash-controller-reply, a boot-loader-request, a boot-loader-reply, a control-program-request, a control-program-reply, a flash-memory-request, and a flash-memory-reply. The flash-memory request/reply may further include the following request/reply pairs: flash ID, read, write, erase, copy-back, reset, page-write, cache-write and read-status.

The host may be a personal computer (PC), a portable computing device, a digital camera, a phone, a personal digital assistant (PDA), or other electronic device. The partition of SRAM among various functions could change over time.

Wider or narrower data buses and flash-memory blocks could be substituted, such as 4, 5, 8, 16, 32, 64, 128, 256-bit, or some other width data channels. Alternate bus architectures with nested or segmented buses could be used internal or external to the microcontroller. Two or more internal and flash buses can be used in the USB flash microcontroller to increase throughput. More complex switch fabrics can be substituted for the internal buses.

The flash mass storage chips or blocks can be constructed from any flash technology including multi-level-logic (MLC) memory cells. Data striping could be used with the flash mass storage blocks in a variety of ways, as can parity and error-correction code (ECC). Data re-ordering can be adjusted depending on the data arrangement used to prevent re-ordering for overlapping memory locations. An hub or switch could be integrated with other components or could be a stand-alone chip. The hub/switch could also be integrated with the USB single-chip flash device. While a single-chip device has been described, separate packaged chips or die may be stacked together while sharing I/O pins, or modules may be used.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another a tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An Extended Universal-Serial Bus (EUSB) device comprising:
  a EUSB analog front end having an input connection to a first pair of differential lines and having an output connection to a second pair of differential lines;
  a serial-parallel converter, coupled to the EUSB analog front end to receive an input serial bitstream received over the first pair of differential lines, and coupled to output an output serial bitstream for transmission over the second pair of differential lines, for converting the input serial bitstream into input parallel words, and for converting output parallel words into the output serial bitstream;
  a frame processor for adding frame bits to the output parallel words, and for removing frame bits from the input parallel words;
  an error-code generator/checker for generating a generated checksum for the input parallel words and for signaling an error when the generated checksum mismatches a transmitted checksum in the input parallel words, and for generating a checksum stored with the output parallel words;
  a bulk-only-transport layer processor for inserting a header for a EUSB protocol into the output parallel words, and for extracting the header from the input parallel words;
  a flash memory for storing data in non-volatile flash-memory cells wherein data is retained when power is disconnected;
  a flash interface for accessing the flash memory;
  a sector buffer for storing the output parallel words read from the flash memory by the flash interface, and for storing input parallel words before writing to the flash memory by the flash interface;
a chained Direct-Memory Access (DMA) engine for transferring the input parallel words from the sector buffer means to the bulk-only-transfer layer processor; and
a microcontroller that generates a not-yet signal that is transmitted to a host over the second pair of differential lines when the sector buffer does not yet contain requested data that is waiting to be read from the flash memory,
whereby the not-yet signal is transmitted over the second pair of differential lines when the requested data is waiting to be read from the flash memory.

2. The Extended Universal-Serial Bus (EUSB) device of claim 1 wherein the chained DMA engine further comprises:
a vector table containing vector entries having pointers to memory group tables;
a vector register that points to a current vector entry in the vector table, the current vector entry having a pointer to a current memory group table;
a memory table pointer register that points to a memory table entry in the current memory group table;
wherein a current memory table entry has a segment starting address of a current memory segment, and a byte count indicating a length of the current memory segment, and a continue flag.

3. The Extended Universal-Serial Bus (EUSB) device of claim 2 wherein the continue flag is in an END state when no more memory table entries follow the current memory table entry.

4. The Extended Universal-Serial Bus (EUSB) device of claim 3 wherein the chained DMA engine further comprises:
a memory group indicator register that indicates a current memory group pointed to by the current memory group table.

5. A method for chaining Direct-Memory Access (DMA) when accessing an extended Universal-Serial Bus (EUSB) device comprising:
sending a request for a new transaction from a host to an EUSB device over a first differential pair of lines by generating physical electrical signals;
sending an acknowledgement to the host over a second differential pair of lines in response to the request for the new transaction by generating physical electrical signals;
sending a first data packet to the host over the second differential pair of lines in response to the request for the new transaction;
receiving an acknowledgement for the first data packet over the first differential pair of lines;
transferring data from a memory in the EUSB device to a sector buffer for storing packet data for transmission to the host by:
setting up a first memory table by writing a plurality of memory-table entries, each memory table entry having a starting address of a memory segment and a byte count for the memory segment and a continue flag;
setting up a second memory table by writing a second plurality of memory-table entries, each memory table entry having a starting address of a memory segment and a byte count for the memory segment and a continue flag;
wherein the continue flag is set to an END state for a final memory table entry for a final memory segment in a group of memory segments;
setting up a vector table having vector entries, each vector entry having a destination pointer and a source pointer, wherein the source pointer points to the first memory table for a first vector entry, and points to the second memory table for a second vector entry;
(a) loading the starting address from the first memory table entry in the first memory table;
transferring bytes from a first memory segment to a destination buffer until a number of bytes transferred from the first memory segment equals the byte count in the first memory table entry in the first memory table;
reading the continue flag for the first memory table entry in the first memory table and when the continue flag is not in the end state:
loading the starting address from a next memory table entry in the first memory table;
transferring bytes from a next memory segment to the destination buffer until a number of bytes transferred from the next memory segment equals the byte count in the next memory table entry in the first memory table;
repeating from (a) for other memory segments in a first group of memory segments pointed to by the first memory table;
when the continue flag for the next memory table entry is in the END state, reading the vector table for the second vector entry, and transferring memory segments for a second group of memory segments pointed to by the second memory table until the continue flag for the next memory table entry is in the END state; and
completing transfer when the continue flag for the next memory table entry in the second memory table is in the END state,
whereby packet data is transferred by chaining DMA for memory segments pointed to by the first memory table and the second memory table.

6. The method for chaining DMA when accessing an EUSB device of claim 5 wherein the continue flag is set to a CONTINUE state for a final memory-table entry for intermediate memory segments in the group of memory segments.

7. The method for chaining DMA when accessing an EUSB device of claim 5 further comprising:
delaying transfer of the next memory segment when a DMA channel for the next memory segment is busy.

8. The method for chaining DMA when accessing an EUSB device of claim 5 further comprising:
incrementing a vector pointer register in a DMA controller when the continue flag for the next memory table entry is in the END state;
using the vector pointer register to locate a next vector entry in the vector table.

9. The method for chaining DMA when accessing an EUSB device of claim 8 further comprising:
incrementing a memory table pointer register in the DMA controller when the continue flag for the next memory table entry is not in the END state;
using the memory table pointer register to locate the next memory table entry in the first memory table or in the second memory table.

10. The method for chaining DMA when accessing an EUSB device of claim 9 wherein the data transferred from the memory segments are sent over the second differential pair of lines from the EUSB device to the host as data packets.

11. The method for chaining DMA when accessing an EUSB device of claim 10 further comprising:
generating a generated checksum from the first data packet received by the host;
sending a not-acknowledgement over the first differential pair of lines when the generated checksum mismatches a transmitted checksum in the first data packet;

resending the first data packet to the host over the second differential pair of lines in response to the not-acknowledgement, whereby data is resent in response to the not-acknowledgement generated by checksum mismatching.

12. The method for chaining DMA when accessing an EUSB device of claim 11 wherein forming the second data packet comprises forming a Universal-Serial Bus (USB) packet.

13. An Extended Universal-Serial Bus (EUSB) system comprising:
an EUSB host;
an EUSB device;
a first pair of differential lines coupled between the EUSB host and the EUSB device, for carrying serial packets from the EUSB host to the EUSB device;
a second pair of differential lines coupled between the EUSB host and the EUSB device, for carrying serial packets from the EUSB device to the EUSB host;
a EUSB bulk-only-transfer and command transaction layer on the EUSB host, for receiving a not-yet signal sent by the EUSB device over the second pair of differential lines;
flash memory means, on the EUSB device, for storing data in non-volatile flash-memory cells wherein data is retained when power is disconnected;
flash interface means, on the EUSB device, for accessing the flash memory means;
sector buffer means, on the EUSB device, for storing output parallel words read from the flash memory means by the flash interface means, and for storing input parallel words before writing to the flash memory means by the flash interface means;
a chained Direct-Memory Access (DMA) engine for transferring the input parallel words from the sector buffer means to the EUSB bulk-only-transfer and command transaction layer;
microcontroller means, on the EUSB device, for generating the not-yet signal that is transmitted to the EUSB host over the second pair of differential lines when the sector buffer means does not yet contain requested data that is waiting to be read from the flash memory means,
whereby the not-yet signal transmitted to the EUSB host when the requested data is waiting to be read from the flash memory means causes the EUSB host to enter a suspend mode and not poll the EUSB device.

14. The Extended Universal-Serial Bus (EUSB) system of claim 13 wherein power consumed by the EUSB host is reduced when the suspend mode is activated by the not-yet signal; and
wherein power consumed by the EUSB device is reduced when the EUSB host avoids polling during the suspend mode activated by the not-yet signal.

15. The Extended Universal-Serial Bus (EUSB) system of claim 13 wherein the EUSB device further comprises:
EUSB analog front end means for sending differential signals on differential lines, the EUSB analog front end means having an input connection to the first pair of differential lines and having an output connection to the second pair of differential lines;
serial-parallel converter means, coupled to the EUSB analog front end means to receive an input serial bitstream received over the first pair of differential lines, and coupled to output an output serial bitstream for transmission over the second pair of differential lines, for converting the input serial bitstream into input parallel words, and for converting output parallel words into the output serial bitstream;
frame processor means for adding frame bits to the output parallel words, and for removing frame bits from the input parallel words;
error-code generator/checker means for generating a generated checksum for the input parallel words and for signaling an error when the generated checksum mismatches a transmitted checksum in the input parallel words, and for generating a checksum stored with the output parallel words; and
bulk-only-transport layer processor means for inserting a header for a EUSB protocol into the output parallel words, and for extracting the header from the input parallel words.

16. The Extended Universal-Serial Bus (EUSB) system of claim 15 further comprising:
full indicator means, coupled to the sector buffer means, for activating the microcontroller means to generate the not-yet signal when the sector buffer means is full and cannot accept data received over the first pair of differential lines.

17. The Extended Universal-Serial Bus (EUSB) system of claim 16 wherein the full indicator means also activates the microcontroller means to generate the not-yet signal when the sector buffer means is not full, but has insufficient space for accepting a packet of data received over the first pair of differential lines;
wherein the packet of data is for writing to the flash memory means.

18. The Extended Universal-Serial Bus (EUSB) system of claim 16 wherein the chained DMA engine further comprises:
a vector table containing vector entries having pointers to memory group tables;
a vector register that points to a current vector entry in the vector table, the current vector entry having a pointer to a current memory group table;
a memory table pointer register that points to a memory table entry in the current memory group table;
wherein a current memory table entry has a segment starting address of a current memory segment, and a byte count indicating a length of the current memory segment, and a continue flag.

19. The Extended Universal-Serial Bus (EUSB) system of claim 18 wherein the continue flag is in an END state when no more memory table entries follow the current memory table entry.

20. The Extended Universal-Serial Bus (EUSB) system of claim 19 wherein the chained DMA engine further comprises:
a memory group indicator register that indicates a current memory group pointed to by the current memory group table.

* * * * *